Dec. 2, 1969  J. P. FELBURN  3,481,627
CARGO FIXTURE FOR TRAILERS
Filed Aug. 16, 1967  2 Sheets-Sheet 1
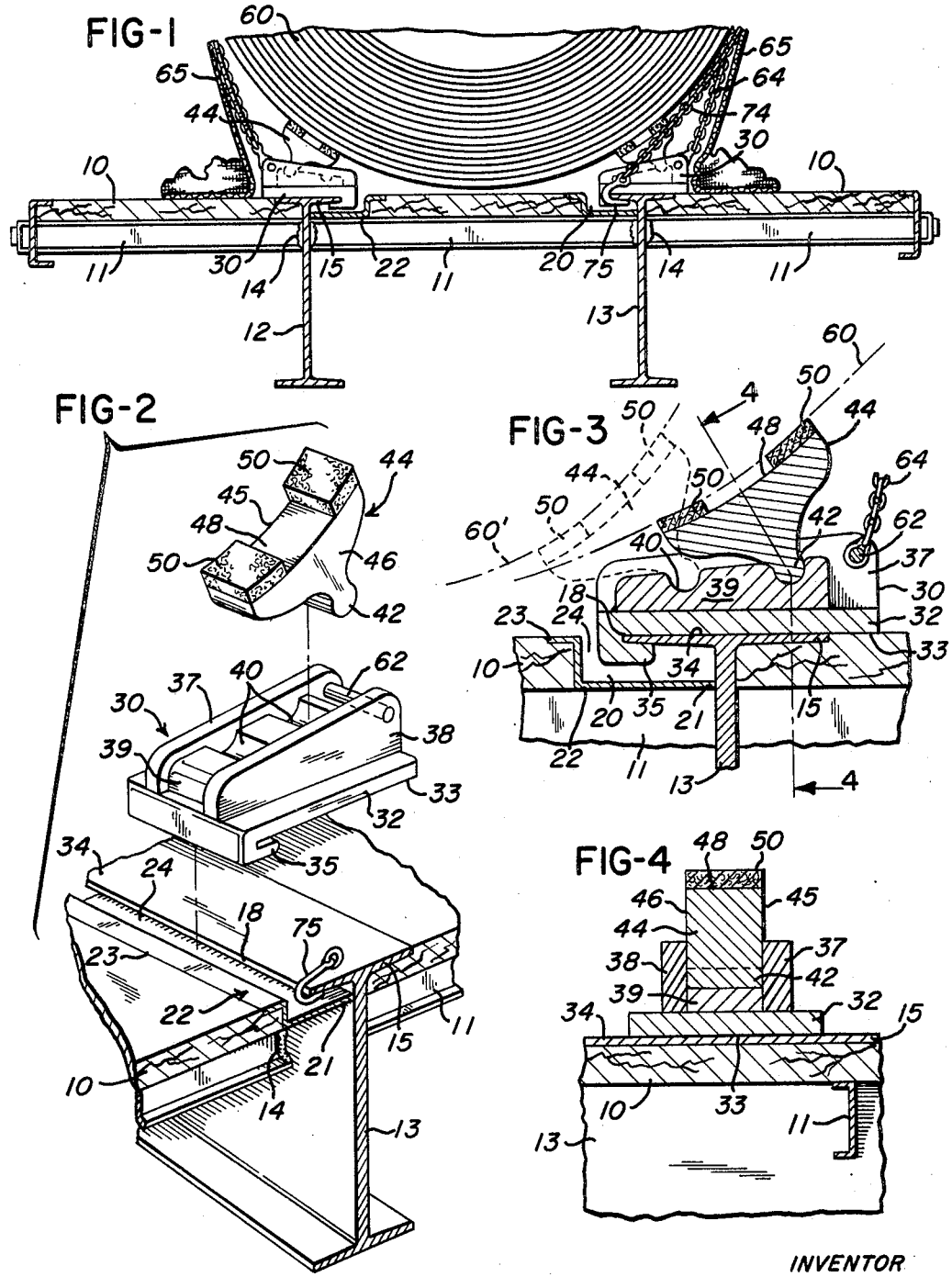
INVENTOR
J. PHIL FELBURN
BY
Marechal, Biebel, French & Bugg
ATTORNEYS

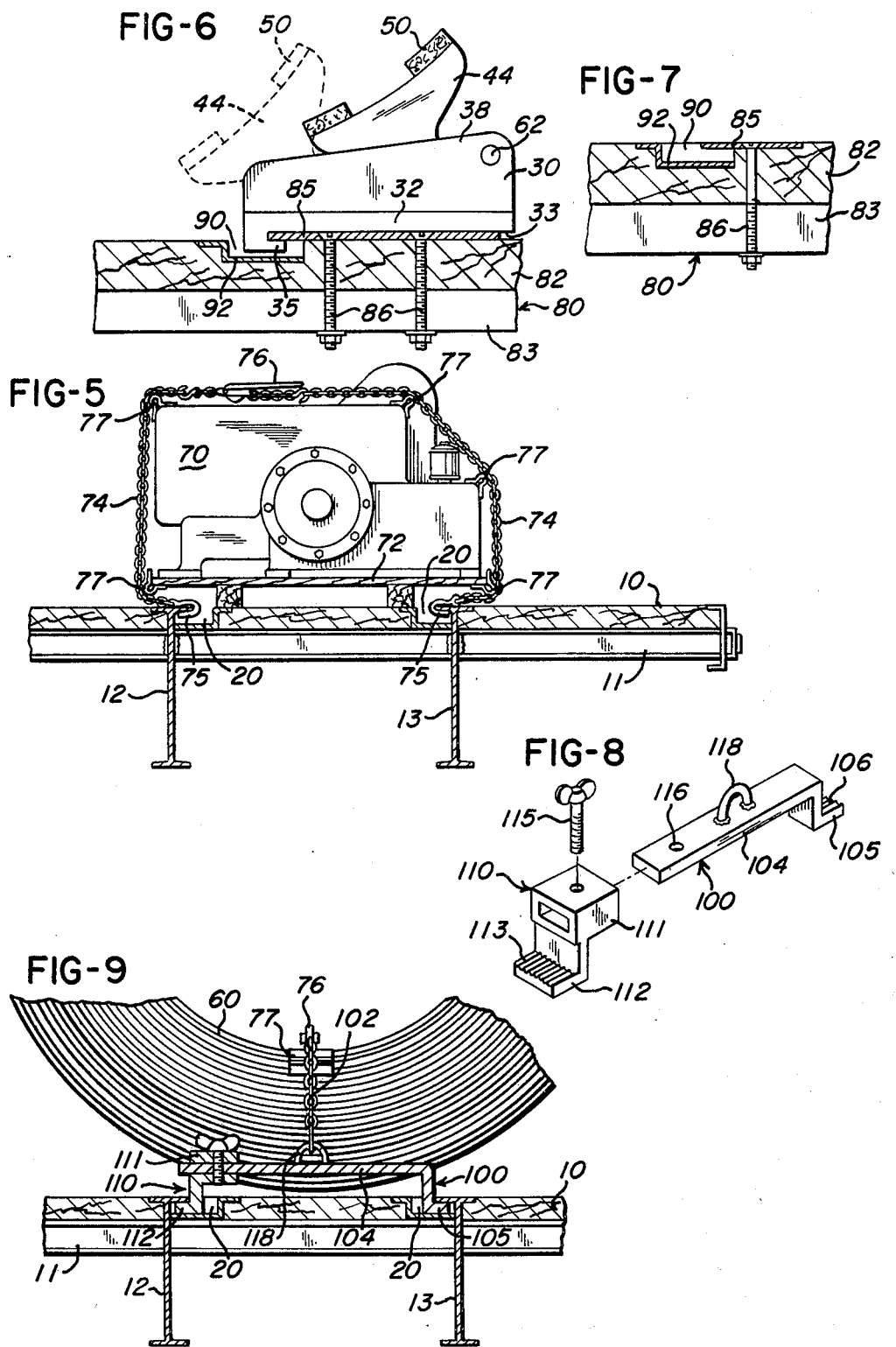

United States Patent Office 3,481,627
Patented Dec. 2, 1969

3,481,627
CARGO FIXTURE FOR TRAILERS
John Phil Felburn, 4160 W. Broad St.,
Columbus, Ohio 43228
Filed Aug. 16, 1967, Ser. No. 661,052
Int. Cl. B60p 7/12; B61d 45/00
U.S. Cl. 280—179                                     12 Claims

ABSTRACT OF THE DISCLOSURE

Cargo support and tie-down fixtures for transporting steel coils and other cargo on flat bed and van trailers in which troughs are formed in the bed adjacent and underlying the inner edges of the I-beams of a flat bed trailer or adjacent auxiliary longitudinal plates on the bed of van trailers, fixtures engage the I-beam or plate along the trough and bear directly on the upper surface of the I-beam or plate. For the purpose of transporting steel coils, shoes may be pivotally supported on the fixtures and are curved to conform with the curvature of the coil to cradle the coil on transversely spaced coil surfaces.

BACKGROUND OF THE INVENTION

This invention relates to cargo hauling and tie-down arrangements for flat bed and van type trailers, and more particularly to arrangements for hauling and transporting coils of steel, although the apparatus of the invention may be used to haul a wide variety of different cargo.

The problem of the hauling of steel coils on trailers with the greatest degree of safety and minimum damage to the coils has been perplexing. Inherently, flat bed trailers and vans are poorly adapted for the hauling of steel coils, unless the coils are positioned on one of their flat ends, as shown, for example, in U.S. Patent 3,004,746. However, this requires additional handling of the coils and special tie-down arrangements to prevent damage to the coils during transit.

Others have attempted to provide more favorable steel coil hauling arrangements which usually require substantial modification to the bed of the trailer, such as by providing a large semi-circular recess in the flooring as shown in U.S. Patent 2,622,918. However such a recess must be sufficiently wide and deep to receive a substantial portion of the circumference of the coil, and accordingly, is not readily adapted for use on most flat bed trailers as it would substantially weaken the bed. Further, such a recess is necessarily only of a single radius and can therefore only fully accommodate coils which are of a corresponding radius.

A further example of prior attempts to accommodate steel coils on flat bed trailers is shown in U.S. Patent 3,197,236. In this case, fixtures are shown which provide only one point support at the sides of the coil and which can accommodate coils of only a single diameter. From a practical point of view, this is a generally unsatisfactory arrangement since commercial haulers of steel coils must be prepared to carry coils of varying diameters and weights. Also, single point contact may frequently result in damage to the outer turns of steel on the coil, resulting in loss to both the shipper and the hauler.

SUMMARY OF THE INVENTION

This invention utilizes, in a flat bed trailer, the rigid support provided by the longitudinal I-beams forming part of the trailer frame to provide direct support for cargo, and particularly for steel coils. Fixture troughs are provided in the flooring adjacent the inner edges of the I-beams forming recesses which extend below the beam edges. Fixtures which have a major portion of their body supported directly on the upper surfaces of the I-beams are provided with hook portions which are received in the trough over the free edge of an I-beam, and are thus longitudinally slidable on the upper surfaces of the I-beams. The fixtures are in turn provided with sockets or recesses for receiving shoe members in selected transverse positions. The shoe members are formed with arcuate supporting surfaces which are alignable by tilting movement of the shoe within the socket to conform to the outer surfaces of the coil. By positioning the shoes selectively in each fixture, coils of differing diameters can be accommodated. The shoes may be provided with fibrous support pads, such as brake lining material, to provide a non-marring and conforming surface for supporting and cradling a coil of steel, while transferring the weight of the coil directly to the frame member of the trailer.

The invention is also applicable to van-type trailers which have not heretofore been generally satisfactory for the hauling of steel coils. Thus, auxiliary bed plates can be installed longitudinally of the flooring, and fixture troughs provided in the flooring along the inner edge of each of the plates providing for longitudinal sliding movement of coil-supporting fixtures substantially in the manner described above. Additionally, the fixture troughs of this invention can be used with hooks for cargo tie-down, either in conjunction with the fixtures, or alone. In addition, the troughs permit the use of a bar fixture which provides a rigid tie-down particularly adapted for use with hauling steel coils, permitting a chain to be threaded through the center opening of the coil and rigidly secured at the opposite ends to the bed.

The apparatus of the present invention provides many desirable advantages and features. Since the fixtures and shoes are slidable longitudinally of the trailer, the most favorable positioning of the cargo on the trailer may be readily achieved. The arrangement provides for support against sideways applied loads. The shoes which contact the outer surfaces of the coils conform to the coil surfaces over a wide range of coil diameter, thus providing versatility in the hauling of loads of varying sizes without modification of the cargo supporting and tie-down arrangements. In a flat bed trailer, the arrangement makes use of the longitudinal I-beams and most if not all of the weight is thus transmitted directly to the I-beams rather than applied generally to the flooring.

When the invention is used with trailers having a stake and panel side arrangement or van-type trailers, no modification is required in the trailer sides, and the tie-down chains may be secured around the cargo from a fixture on one side to a fixture on the other, and the tarpaulin may by closely wrapped around the cargo over the outside of the tie-down chains. This eliminates the necessity for bringing the chains out to the sides of the trailer, which often requires cutting holes in the panel sides in order to provide for the securing of the chains. Also, it eliminates the large open pockets between the tarpaulin and the cargo and permits the tarpaulin to be nested closely around the cargo in order to keep the load dry and to prevent flapping of the tarpaulin.

The invention permits the conversion of monocoque constructed van-type trailers for use in carrying a heavy cargo, such as coils of steel, with a minimum of modification. When steel coils are not being carried, the van trailer can be applied to its normal useage, providing increased versatility for this type of unit.

BRIEF DESCRIPTION OF THE DRAWINGS

FIG. 1 is a transverse section through a flat bed trailer having a cargo support and tie-down arrangement according to this invention, and showing a fragmentary portion of a steel coil supported on the trailer bed;

FIG. 2 is an exploded perspective view showing the fixture trough, the fixture, and the coil-supporting shoes of this invention;

FIG. 3 is an enlarged transverse section through one of the fixture troughs, fixtures and shoes of this invention, showing a shoe in a broken outlined moved position for hauling smaller diameter coils of steel;

FIG. 4 is a vertical section through the fixture and shoe taken generally along the line 4—4 of FIG. 3;

FIG. 5 is a transverse section through a flat bed trailer with fixture troughs constructed according to this invention showing the manner in which conventional cargo may be carried;

FIG. 6 is an enlarged fragmentary transverse section through the flooring of a van-type trailer showing the manner of applying this invention thereto.

FIG. 7 is a slightly modified form of the apparatus of FIG. 6;

FIG. 8 is a perspective view of a bar fixture adapted for use in the fixture troughs and providing a cargo tie-down; and FIG. 9 is a transverse section similar to FIG. 5 showing the manner of use of the bar fixture of FIG. 8.

DESCRIPTION OF PREFERRED EMBODIMENTS

Referring to the figures of the drawing which illustrates preferred embodiments of the invention, FIG. 1 shows a flat bed trailer constructed according to this invention having a wooden flooring forming a cargo bed 10 supported on a plurality of transverse sills 11.

I-beams 12 and 13 extend longitudinally substantially the length of the trailer bed and form the primary support structure for the trailer bed. The individual sills 11 are preferably butt welded against the sides of the I-beam as indicated generally at 14 in FIG. 1 to provide transverse strength. The flanged tops 15 of each of the I-beams 12 and 13 are preferably formed flush with the upper surface of the bed 10, in a typical trailer construction.

Referring to FIGS. 2 and 3, a portion of the wooden flooring making up the bed 10 is removed adjacent the inner edges 18 of each of the I-beams defining a pair of spaced-apart, longitudinally-extending fixture troughs 20. Each trough 20 may conveniently be defined or lined by a generally Z-shaped sheet metal trough plate 22 which has an inner end 23 butted against the side of the I-beam and which has an upper flange 23 flush with the bed 10. The trough 20 is thus partially in underlying relation to the inner edge 18 of the upper flange 15 of each of the I-beams 12 and 13, and is transversely slightly wider than one half of the I-beam top 15 providing an open access space 24 between the free edge 18 of the I-beam and the adjacent surface of the trough plate 22. The overlying portion of the I-beam may thus be considered as a horizontally disposed plate means in the bed 10 which is positioned in partially overlying relation to the trough 20.

Support fixtures 30 for each of the troughs may be formed with a generally flat rectangular bottom plate 32 having a lower surface 33 which is received in direct supported relation on the upper surface 34 (FIG. 3) of the I-beam top 15. The bottom plate 32 is further formed with a downwardly and inwardly turned front lip 35 adapted to be received in encircling relation to the free or open edge 18 of the I-beam, with the lip 35 received within the trough 20, substantially as shown in FIG. 3. The lip 35 secures the fixture 30 to the I-beam top and prevents the fixture from tilting or tipping away from the upper surface 34 of the I-beam while permitting guided longitudinally sliding movement of the fixture 30 along the upper surface 34. The lip 35 preferably has a transverse length related to the trough opening permitting easy insertion and removal from the trough 20.

The fixture 30 is further provided with upstanding, transversely aligned spaced side plates 37 and 38 which may be welded or otherwise suitably secured to the base plate 32. A central portion 39 forms a plurality of transversely-positioned, semi-circular sockets 40 between the plates 37 and 38 to provide means for receiving a similarly configured semi-cylindrical end 42 of a shoe 44. The portion 39 of the fixture trough 30 defining the sockets 40 and the side plates 37 and 38 may be formed integrally with the base plate 32 such as by casting, or may be fabricated of individual parts and suitably welded together, as shown.

A plurality of the fixtures 30 are accordingly provided and are adapted to be mounted along each of the fixture troughs, two of such fixtures being shown in FIG. 1. As many fixtures may be used as needed adequately to support the load carried thereon.

The shoe 44 is preferably formed with flat side surfaces 45 and 46, as perhaps best shown in FIG. 4, providing a relatively close fit with the cooperating inner surfaces of the side plates 37 and 38 of the fixture. The lower semi-cylindrical end 42 of the shoe 44 is pivotally received in one of the sockets 40 and provides for self-aligning pivotal movement of the shoe in the transverse direction to conform to various diameters of loads carried thereon. For this purpose, the shoe is formed with an upper surface 48 upon which the pads 50 of resilient material are mounted. The pads 50 may thus be formed conveniently of brake lining material or other fibrous and non-marring, but tough, weight-supporting composition.

The upper surface 48 and the conformed pads 50 are thus configured to lie on a radius of curvature which rather closely approximates that of a steel coil 60 to be carried thereon. Accordingly, since two pads 50 are provided in accurately spaced relation on each of the shoes 44, the coil 60 is supported at its outer surface at two locations by each of the shoes 44, and is cradled between pairs of transversely positioned fixtures 30 and shoes 44, as shown in FIG. 1. The pivotal movement of the shoes 44 in the sockets 40 assure alignment of the shoes to accommodate the coil diameter. The provision of a plurality of transversely positioned sockets 40, such as the two sockets shown in the trough 30 in FIGS. 2 and 3, permits the transverse position of the shoe 40 to be selected in accordance with the diameter of the coil 60. Thus, the shoe 44 can be moved to the inner position as shown by the broken lines in FIG. 3. to accommodate a coil 60' of smaller diameter than that of the coil 60.

Each of the fixtures 30 may be provided with a chain tie-down pin 62 extending outwardly of the sockets 40 between the plates 37 and 38. In this manner, the same fixture which supports the coil 60 also provides means for securing the tie-down chain 64 in encircling relation to the coil 60, thus eliminating the necessity of carrying the tie-down chains out to the outer sides of the trailer bed to other or separate tie downs. Similarly, a tarpaulin 65 (FIG. 1) may be wrapped in closely conforming relation to the coil 60 and to the tie-down chain 64, eliminating substantially all air spaces around the coil and maintaining the cargo in essentially dry condition.

The fixture trough apparatus of the present invention also has utility in assisting the support and tie-down of cargo other than steel coils 60. For example ordinary machinery such as is shown at 70 in FIG. 5 may be suitably supported on a pallet 72 on the upper surface of the bed 10, and tied down by one or more chains 74 which has hooks 75 formed on its opposite ends and received within the troughs 20 in encircling relation to the free edge 18 of the respective I-beams. Suitable load binders 76, such as turn-buckles, lever-operated chain clamps or ratchet screws may be used. Suitable semi-circular stand-off brackets 77 with outwardly separated legs may be provided at the corners to space the chain from the equipment 70 to prevent marring of the cargo.

The apparatus of this invention is also applicable to van-type trailers of the monocoque construction, to enable these trailers safely to haul rolls of steel and the like providing positive support for such cargo. In FIG. 6, a fragmentary section of a van-type trailer bed is shown generally at 80 as including wood flooring 82 supported on transverse sills 83. A pair of generally horizontally and longitudinally-extending plate members 85 are mounted on an upper surface of the flooring 82 (only one side being shown in FIG. 6). The plate member 85 is retained by pairs of retainer bolts 86 which extend through the flooring and engage the bottom surfaces of the channel-shaped sills 83.

A fixture trough 90 for each plate member 85 is formed in the flooring 82 such as by rabbitting out a portion of the flooring next adjacent one overlying edge of the plate 85. If desired, the fixture trough plate 92 corresponding in shape and form to the plate 22 of FIG. 3 can be added. In this manner, a fixture trough defined, in part, by plate means partially overlying the trough, may be provided for the purpose of supporting the fixture 30 and the associated shoes 44. It is understood that two such plates 85 and troughs 90 are provided in the bed 80 at transversely spaced locations for supporting coils 60 and the like substantially in the manner shown in FIG. 1.

If desired, the plate 85 may be recessed level with the top of the flooring 82, substantially as shown in FIG. 7. This would be a preferred construction in adapting the invention to new construction concurrent with the manufacture of the van, while the construction of FIG. 6 would be preferred in retro-fitting existing vans.

In many instances, it is desirable to provide a positive tie-down extending longitudinally of the cargo, such as a tie-down chain which extends from one side of the coil through the center opening to the other side of the coil, substantially as shown in FIG. 9. For this purpose, a fixture bar 100 may be provided as shown in FIGS. 8 and 9 which extends transversely between the troughs 20 to provide means for securing a chain 102. A suitable such bar fixture 100 may include a first portion 104 having a horizontal body adapted to be positioned transversely in overlying relation to the bed 10, and a downwardly and outwardly directed foot 105 adapted to be received in one of the troughs 20 and in underlying relation to the adjacent flange of the I-beam. The upper surface of the foot 105 may be serrated as indicated at 106 to provide a gripping effect with the I-beam, and is formed of such a length that it may readily be inserted in the trough 20.

The bar fixture also includes a second portion 110 formed with a rectangularly open body 111 adapted to be received in interfitting relation with the extended end of the first portion 104. The second portion 110 is similarly formed with a downwardly and outwardly extending foot 112, also similarly formed with serrations 113 on the upper surface thereof, for receiving in the opposite trough 20.

The bar fixture may thus be assembled by sliding the two portions apart so that their respective feet 105 and 112 are engaged within the opposite fixture troughs and received under the adjacent flanges of the I-beams. They may thus be held in this spread apart condition by a wing bolt 115 threaded into the portion 111 and through a suitable aperture 116 formed in the portion 104. The portion 104 may be provided with a chain receiving loop 118 for receiving the end of the chain 102. In this manner, a high-strength, positive gripping fixture is provided for use with a pair of longitudinally extending fixture troughs for providing an anchor for securing the ends of a tie-down chain centrally of the van or trailer.

The operation of the invention is largely self-evident from the foregoing description. It will be seen that the fixtures 30 may be slid in position with their looped ends 35 in encircling relation to the free end 18 of the associated I-beam or the corresponding free ends of the plate members 85 in the case of the embodiments of FIGS. 6 and 7. The fixture 30 provides a positive weight-bearing support for the shoes 44, transmitting the weight of the coils or cargo directly through the fixture and to the top of the load-bearing structure. The coils are accordingly positioned for safe transport with a minimum of likelihood of damage to the coil material, while the shoes 44 automatically conform themselves, by pivotal movement in the fixture 30, to the circumference of the coils. The shoes 44 may also be selectively positioned transversely of the fixture in the sockets 40 to accommodate coils of differing sizes. The chains 64 may then be connected directly to the fixtures at the pin 62, and, if desired, one or more bar fixtures 100 may be employed for securing the coils by tie-down chains through the coil centers. These may be used in combination with the chains 74 and hooks 75. It is understood that combinations of cargo tie-downs disclosed herein may be used together. Thus, the chains 74 and hook 75 may be used independently of, and spaced from, the fixtures 30, with a given cargo.

When it is desired to transport equipment or cargo other than steel coils, the fixtures 30 and shoes 44 may be readily removed, leaving a floor substantially unobstructed permitting pallets to be moved thereacross in the normal manner. The fixture troughs and overlying plates accordingly then provide a convenient attachment for tie-down apparatus in the manner illustrated at FIG. 5. Additionally, one or more of the fixture bars 100 may be used as a convenience in tying down other cargo.

While the forms of apparatus herein described constitute preferred embodiments of the invention, it is to be understood that the invention is not limited to these precise forms of apparatus, and that changes may be made therein without departing from the scope of the invention.

What is claimed is:

1. An improved cargo support and tie-down arrangement for a trailer having a flat floor bed comprising means in said bed defining a pair of spaced apart, longitudinally extending fixture troughs, a pair of elongated generally horizontally disposed plate means in said bed one each positioned in partially overlying relation to each said trough, each said plate means extending longitudinally of its associated said trough and also extending transversely of said bed from a position adjacent the remote side of the associated said trough forming with the opposite said plate means mutually inwardly facing free edges in partial overlying relation to the associated said trough, support fixtures for each said trough with each said fixture having a body defining a flat bottom surface with a major transverse portion thereof received in direct supported relation on an upper surface of one of said plate means and being provided with a hook portion extended into said trough in encircling relation to said plate means free edge and adapted for longitudinally sliding movement on said plate means, and means on each said fixtures for supporting cargo in cooperative relation with a transversely opposite said fixture in which said hook portions exert transversely outward forces on said free edges.

2. The arrangement of claim 1 in which said fixture cargo support means includes at least one pocket formed in each said fixture, and a shoe for each said fixture having a lower portion received in said pocket for pivotal movement about a longitudinal axis parallel to said plate means and having an upper load-supporting portion for directly engaging and supporting a load thereon.

3. The arrangement of claim 2 in which said shoes are formed with generally planar side surfaces and in which said pockets are formed in said fixtures with cooperating side surfaces closely engaging the said side surfaces of said shoes for supporting said shoes against rocking movement in the longitudinal direction of said bed.

4. The arrangement of claim 3 in which said shoes are each formed with a curved supporting surface being proportional to engage the outer cylindrical surface of a coil of steel for supporting the weight of said coil thereon and transmitting the weight through said fixture and to said plate means.

5. The arrangement of claim 4 in which said fixtures are formed with a plurality of transversely spaced said pockets, with said shoe being selectively positionable in said pockets to conform to different diameters of coils supported thereon.

6. The arrangement of claim 3 in which said fixture is provided with means defining a cargo chain attachment positioned in transversely spaced relation to said hook portion for accepting cargo tie-down chains.

7. The arrangement of claim 1 further comprising a cargo tie-down bar including a first portion having offset foot means positioned on one end thereof to be received in one of said troughs when said first portion is in overlying relation to the associated said plate means and transversely of said bed, a second portion formed in interfitting relation to said first portion, said second portion being similarly formed with offset foot means positionable in the other of said troughs, means removably securing said first and second portions together with the respective said foot means engaged within said fixture troughs, and means on one of said portions for fastening a cargo tie-down chain thereto.

8. The arrangement of claim 1 in which said plates comprise the upper flanges of I-beam frame members extending longitudinally of said trailer.

9. The arrangement of claim 1 in which said trailer is a van-type trailer and in which said bed comprises an upper wooden flooring supported on transverse sill members and in which said plate means comprise longitudinal metal plates fastened to said bed by fastener members extending from said plates downwardly through said bed and engaging said sill members, and in which said troughs are formed in said wooden flooring.

10. In generally rectangular trailer platforms having substantially flat upper cargo bearing surfaces, the improvement for conveniently securing and tying down heavy articles to such platform for transport comprising, means defining a pair of parallel, spaced-apart, longitudinally-extending fixture troughs formed within said platform, a corresponding pair of elongated longitudinally extending and generally horizontally disposed rigid plate members fixed with respect to said platform and each being positioned in partially overlying relation to one of said troughs, each of said plate members extending transversely of said platform from a position adjacent the remote side of its associated said trough forming with the opposite said plate member mutually inwardly facing free edges in partially overlying relation to the associated said trough and having a generally flat upper support surface disposed substantially flush with said platform surface, said plate members defining with said troughs longitudinally extending openings for receiving fastening devices projecting into said troughs from a position above said plate members at all longitudinal positions along said troughs, a fixture having a substantially flat lower surface adapted to rest on one of said members and including hook means for engaging the corresponding said free edges and exerting a transversely outward force thereon, and a shoe pivotally mounted on said fixture and having curved support means for engaging the curved surface of a roll of sheet material.

11. The combination defined in claim 10 wherein said fixture includes means defining a plurality of semi-cylindrical sockets disposed in laterally spaced relation, and said shoe including a semi-cylindrical portion adapted to be selectively positioned in one of said sockets.

12. The combination as defined in claim 10 wherein said fixture comprises a base member having an integral hook-shaped edge portion for engaging said lip portion, a pair of parallel spaced flange members projecting upwardly from said base member, means defining at least one semi-cylindrical socket extending between said flange members, and a rod extending between said flange members for connecting a binding chain to said fixture.

References Cited

UNITED STATES PATENTS

| | | | |
|---|---|---|---|
| 1,780,277 | 11/1930 | Seeley et al. | 280—179 |
| 2,332,991 | 10/1943 | Commire | 280—179 |
| 2,697,631 | 12/1954 | Miller | 280—179 |
| 3,038,740 | 6/1962 | Blunden | 280—179 |
| 3,177,007 | 4/1965 | Oren | 280—179 |
| 3,197,236 | 7/1965 | Burton | 280—179 |

LEO FRIAGLIA, Primary Examiner

J. E. SIEGEL, Assistant Examiner

U.S. Cl. X.R.

105—369